(12) United States Patent
Benito Santiago et al.

(10) Patent No.: US 8,240,995 B2
(45) Date of Patent: Aug. 14, 2012

(54) WIND TURBINE, AERODYNAMIC ASSEMBLY FOR USE IN A WIND TURBINE, AND METHOD FOR ASSEMBLING THEREOF

(75) Inventors: Pedro Luis Benito Santiago, Móstoles (ES); Eugenio Yegro Segovia, Serranillos del Valle (ES)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/972,649

(22) Filed: Dec. 20, 2010

(65) Prior Publication Data

US 2011/0206509 A1    Aug. 25, 2011

(51) Int. Cl.
*F03D 7/00*    (2006.01)

(52) U.S. Cl. ............... 416/126; 416/200 R; 416/201 A; 416/203

(58) Field of Classification Search ............. 416/227 R, 416/227 A, 198 R, 200 R, 201 R, 201 A, 416/87, 132 B, 175, 203, 238, 23, 126, 124; 415/4.1, 4.3, 4.5, 908; 290/55; 29/889
See application file for complete search history.

(56) References Cited

U.S. PATENT DOCUMENTS

| | | | |
|---|---|---|---|
| 7,074,011 B1 * | 7/2006 | Wobben | 416/126 |
| 7,396,207 B2 * | 7/2008 | DeLong | 416/87 |
| 2005/0214119 A1 * | 9/2005 | Miller | 416/126 |
| 2011/0116923 A1 * | 5/2011 | Larsen et al. | 416/1 |
| 2011/0206509 A1 * | 8/2011 | Benito Santiago et al. | 416/23 |

FOREIGN PATENT DOCUMENTS

JP    56138465 A * 10/1981

OTHER PUBLICATIONS

Niels N. Sorensen "Prediction of Multi Element Airfoils With the EllipSys Code", Research in Aeroelasticity EFP-2007-II, Risø-R-1698, Jun. 2009, ISBN 978-87-550-3759-5, pp. 96-102.

MacGaunaa, et al. "Thick Airfoils & High Lift", Research in Aeroelasticity EFP-2007-II, Risø-R-1698, Jun. 2009, ISBN 978-87-550-3759-5, pp. 103-112.

* cited by examiner

*Primary Examiner* — Edward Look
*Assistant Examiner* — Christopher R Legendre
(74) *Attorney, Agent, or Firm* — Global Patent Operation; Douglas D. Zhang

(57) ABSTRACT

The present disclosure relates to a wind turbine (10) including: a rotor (18) including a rotatable hub (20) and a plurality of rotor blades (22), each of the plurality of rotor blades (22) being attached to the hub (20); and at least one airfoil body (120) including an aerodynamic profile (156) and an airfoil body root portion (122); wherein the aerodynamic profile (156) is configured for increasing aerodynamic lift of at least an inner portion of a rotor blade (22); and the at least one airfoil body (120) is attached to the hub (20) at the airfoil body root portion (122). In addition thereto, the present disclosure relates to an aerodynamic assembly (118) for a wind turbine (10) and a method of assembling a wind turbine (10).

19 Claims, 7 Drawing Sheets

WIND TURBINE, AERODYNAMIC ASSEMBLY FOR USE IN A WIND TURBINE, AND METHOD FOR ASSEMBLING THEREOF

BACKGROUND OF THE INVENTION

The subject matter described herein relates generally to methods and systems for a wind turbine, and more particularly, a method of assembling a wind turbine and an aerodynamic assembly for use with a wind turbine.

Wind turbines generally include a tower and a nacelle mounted on the tower. A rotor is rotatably mounted to the nacelle and is coupled to a generator by a shaft. A plurality of blades extends from the rotor. The blades are oriented such that wind passing over the blades turns the rotor and rotates the shaft, thereby driving the generator to generate electricity. In particular, the wind generates a torque force along the blades. This torque is not constant along the blade. Generally, the torque generated at an inner portion of the blade is smaller than the toque generated at an outer portion of the blade. The torque along the blade generally depends on the particular wind conditions.

The angle of attack (i.e., the angle between the chord line of the blade and the oncoming wind flow) may vary along the blade in order to increase the torque at an inner portion of the blade. In particular, the angle of attack can be twisted from the inner portion of the blade to an outer portion thereof. However, this generally implies a complex blade shape, which may result in a significant cost increase. Furthermore, this approach for increasing the angle of attack at the inner portion of the rotor blade does not provide dynamic control of the torque along the blade in response to varying wind conditions.

Dynamic control of the torque along the blade may be implemented by providing an adjustable angle of attack at the inner portion of the blade, for example, by attaching a movable slat to the blade. However, such a movable slat may be insufficient or even unsuitable for particular requirements posed by certain wind conditions.

Accordingly, it is desirable to provide alternative methods and/or systems capable of increasing lift at an inner portion of the blade.

BRIEF DESCRIPTION OF THE INVENTION

In one aspect, a wind turbine is provided, which includes a rotor including a rotatable hub and a plurality of rotor blades, each of the plurality of rotor blades being attached to the hub, and at least one airfoil body including an aerodynamic profile and an airfoil body root portion. The aerodynamic profile is configured for increasing aerodynamic lift of at least an inner portion of a rotor blade. The at least one airfoil body is attached to the hub at the airfoil body root portion.

In another aspect, a method of assembling a wind turbine is provided. The wind turbine includes a rotor, a rotatable hub, and a plurality of rotor blades, each of the plurality of rotor blades being attached to the hub. The method includes disposing at least one airfoil body in the rotor, the at least one airfoil body including an aerodynamic profile and an airfoil body root portion, such that the at least one airfoil body is attached to the hub at the airfoil body root portion. The aerodynamic profile is configured for increasing aerodynamic lift of at least an inner portion of a rotor blade.

In yet another aspect, an aerodynamic assembly for use with a wind turbine is provided. The wind turbine includes a rotor, a rotatable hub, and a plurality of rotor blades, each of the plurality of rotor blades being attached to the hub. The aerodynamic assembly includes at least one airfoil body including an airfoil body root portion, and a coupling system for attaching the airfoil body root portion to the hub. The coupling system is adapted for fixing a relative position between the at least one airfoil body and the plurality of rotor blades during a rotation of the rotor and adjusting the position of the at least one airfoil body relative to the plurality of rotor blades. In particular, the coupling system may include a drive system configured for performing these tasks, as further detailed below.

By including an airfoil body, which is attached to the hub at the airfoil body root portion, embodiments herein generally facilitate increasing lift of an inner portion of the rotor blades without inevitably requiring a modification of the rotor blades. Furthermore, by facilitating adjustment of the position of the airfoil body relative to the rotor blades, at least some embodiments herein generally facilitate efficiently responding to varying wind conditions.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art is set forth more particularly in the remainder of the specification, including reference to the accompanying figures wherein.

DETAILED DESCRIPTION OF THE INVENTION

Figure 1:
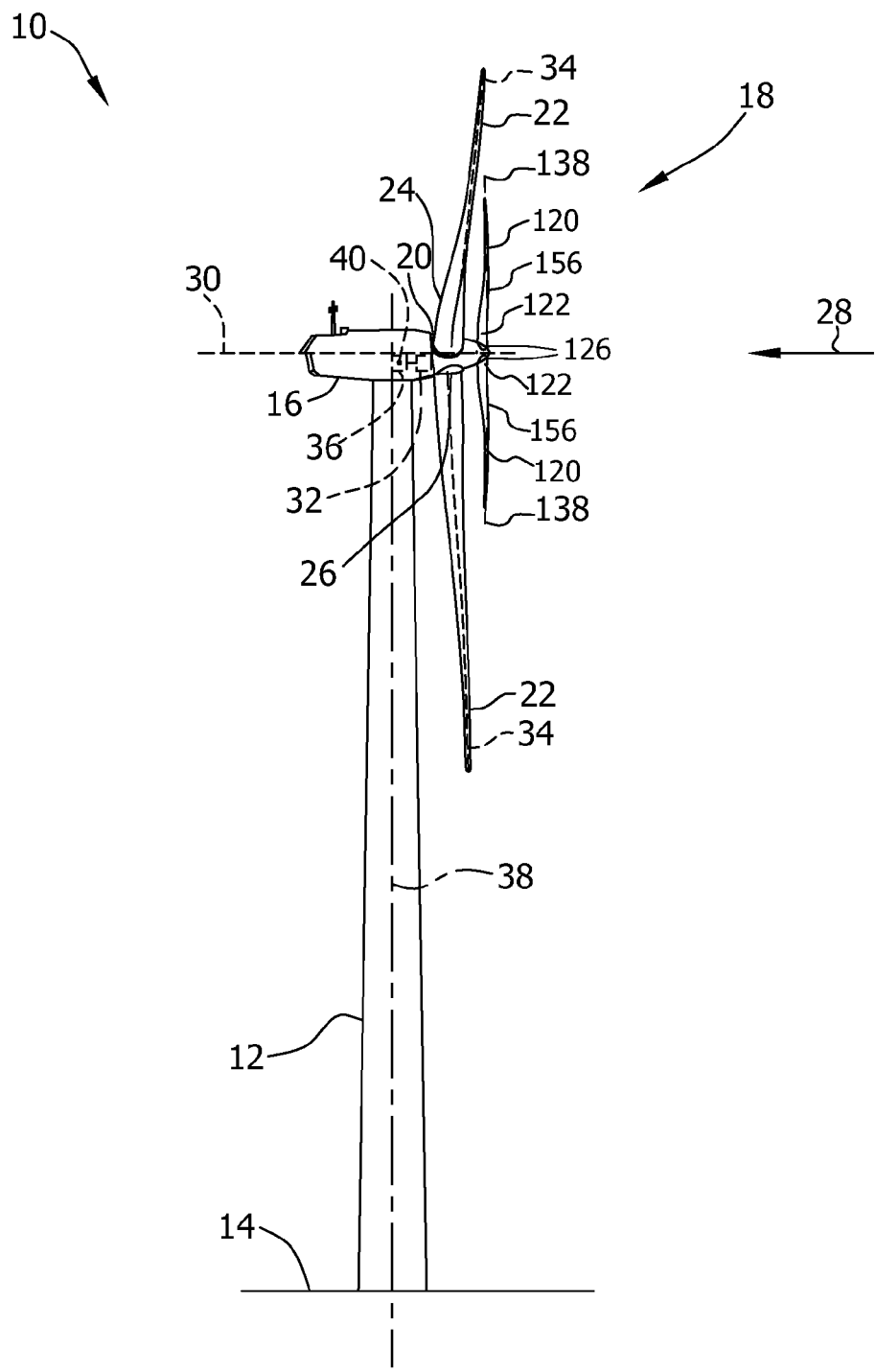
FIG. 1 is a perspective view of an exemplary wind turbine.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

As set forth above, a wind turbine may include slats coupled to the rotor blades for increasing the torque/lift at an inner portion of the blade (i.e., a portion of the blade proximal to the wind turbine hub or adapted thereto). In particular, a slat is understood as an elongated body having an aerodynamic surface, which is coupled to the leading edge of a rotor blade in a movable manner. Typically, a slat, when deployed, allows the rotor blade to operate at a higher angle of attack at its inner portion. Thereby, lift and torque at an inner portion of the blade may be increased.

Such slats generally require fixing elements for fixation thereof to the rotor blade. Such fixing elements may lead to a reduced aerodynamic performance of the wind turbine rotor since the rotor blades, and in particular their leading edges, may have to be modified. Furthermore, such slats may lead to a significant cost increase since they may require a modification of the rotor blades. Furthermore, control of lift by adjusting the position of such slats may be limited since such slats are spatially constrained to an area proximal to the rotor blades.

Embodiments described herein include an airfoil body designed to increase aerodynamic lift of an inner portion of a rotor blade, which airfoil body is attached to the hub at the airfoil body root portion. According to embodiments herein, a "root portion" is an end portion of an element of the wind turbine rotor (i.e., a blade or an airfoil body), which end portion is typically configured to transmit a load generated by this element to the rotor hub. An airfoil body according to embodiments herein facilitates increasing aerodynamic lift of the inner part of an associated rotor blade inevitably requiring modification thereof, in contrast to the slats discussed above. As set forth above, such modifications of the rotor blade may compromise the aerodynamic performance of the blades, as well as significantly increasing their design and manufacturing costs.

In addition thereto, an airfoil body according to at least some of the embodiments disclosed herein does not add static load to the rotor blades since the airfoil body is attached to the hub at the airfoil body root portion. Thereby, the main load generated by the airfoil body may be directly transferred to the hub via load transfer areas at the hub. With the term "directly" it is meant that the main load generated by the airfoil body is not transferred to the hub via a rotor blade, as the case may be for the slats discussed above. According to other embodiments, the airfoil body may contact a rotor blade for stabilizing the airfoil body. Although in such embodiments the rotor blade may be additionally loaded by the contact with the airfoil body, a significant portion of the load generated by the airfoil body is still transferred to the hub via the airfoil root portion.

As set forth above, implementing an airfoil body as described by embodiments herein facilitates increasing the aerodynamic lift at the inner portion of the rotor blades, which facilitates increasing wind capture of the wind turbine. Furthermore, increasing lift of an inner portion of the rotor blades generally facilitates avoiding that an insufficient torque on that part of the rotor blade may lead to an undesired stall of the rotor.

Moreover, attaching the airfoil body root portion to the hub facilitates an adjustment of the airfoil position (for example in response to varying wind conditions) without inevitably having to add adjustment elements to the rotor blades for adjusting the position of an airfoil element attached thereto, as the case may be for the slats described above. In embodiments herein, such adjustment elements for adjusting the effect of the airfoil body on an associated rotor blade may, therefore, be disposed in the hub. Thereby, the aerodynamic performance of the rotor blades is generally not compromised. According to embodiments herein each of these airfoil bodies is associated to one rotor blade for increasing aerodynamic lift of at least an inner portion of the associated rotor blade.

According to certain embodiments, an airfoil body is attached to the rotor hub in a manner such that a relative position between the airfoil body and the rotor blades is fixable during a rotation of the rotor; and this relative position is adjustable for regulating the increase of aerodynamic lift of at least an inner portion of a rotor blade. For example, at least some embodiments herein include a coupling system which is adapted (e.g., by including a suitable drive system) for maintaining fixed an airfoil body relative to the rotor blades and adjusting this relative position when required (for example, in response to a change of the wind conditions). Thereby, at least some of the embodiments included herein facilitate controlling the torque along the rotor blades, in particular, of an inner portion thereof. Thereby, adjusting the aerodynamic lift on the rotor blades by varying the position of the airfoil body without requiring a shutdown of the wind turbine is facilitated.

As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "rotor hub" is intended to be representative of a central region of a wind turbine rotor. Generally, both the blades and the airfoil bodies according to embodiments herein radiate from the same rotor hub. As used herein, the term "drive" is intended to be representative of a device (such as, but not limited to, a motor) for imparting forward motion by generation of a mechanical force.

As used herein, the term "airfoil body" is intended to be representative of a body with at least a portion having an aerodynamic profile, such that the body, when moved relative to a surrounding fluid, alters the flow of the surrounding fluid. As used herein, the term "blade" is intended to be representative of any device that provides a reactive force when in motion relative to a surrounding fluid. Such a reactive force has a component perpendicular to the direction of the relative body-fluid motion, which is referred to herein as lift or aerodynamic lift. The component of the reactive force parallel to the relative body-fluid motion is referred to herein as drag. These components of the reactive force acting on the rotor blades are illustrated in FIG. 7.

Figure 7:
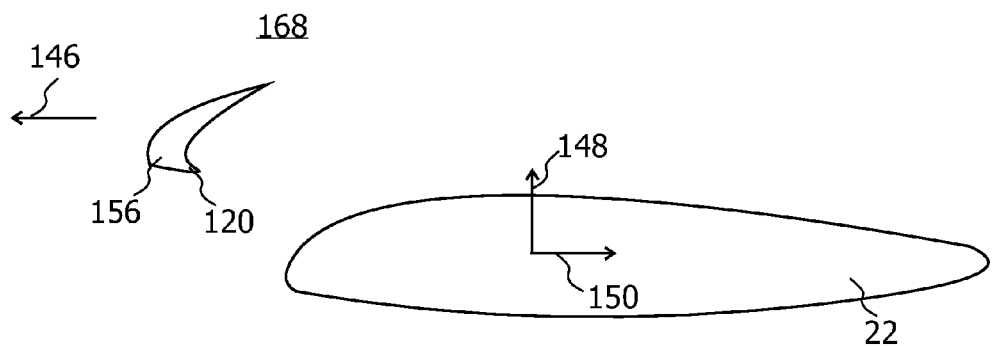
FIG. 7 schematically shows a sectional view of a rotor portion of the wind turbine shown in FIG. 1.

In particular, FIG. 7 shows a sectional view of an airfoil body 120 having an aerodynamic profile 156 and disposed in the proximity of a rotor blade 22. Both airfoil body 120 and rotor blade 22 are implemented on a rotor hub (see below), so that they can simultaneously rotate about the rotor rotational axis (see axis of rotation 30 in FIG. 1) in a rotation direction. During the rotation, rotor blade 22 moves relative to a surrounding fluid 168 (e.g., air) in a direction 146. Thereby a reactive force is generated on rotor blade 22. This reactive force generally has two components: an aerodynamic lift force 148 and a drag force 150. According to embodiments herein, airfoil body 120 may effect an increase on lift force 148 due to aerodynamic profile 156 and the airfoil body's relative position with respect to rotor blade 22.

As used herein, the feature that an aerodynamic profile is configured for increasing aerodynamic lift of at least an inner portion of the blade is intended to refer to an aerodynamic profile, which has been chosen for altering the flow of the surrounding fluid in a manner such that the lift at that portion of the blade is increased when both the airfoil body and the blade are at an appropriate position relative to each other and there is a relative motion relative to a surrounding fluid.

Within the following description of the drawings, the same reference numbers refer to the same components. Generally, only the differences with respect to the individual embodiments are described.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 attached to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by attaching a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment of FIG. 1, control system 36 is shown as being centralized within nacelle 16; however, control system 36 may be a distributed system throughout wind turbine 10, on support system 14, within a wind farm, and/or at a remote control center. Control system 36 may include a processor (not shown) configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 12:
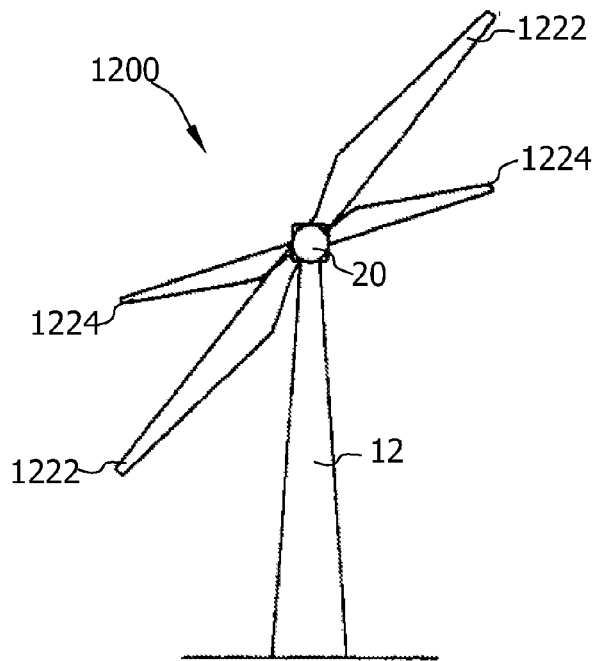
FIG. 12 is a schematic view of an exemplary wind turbine.

In the exemplary embodiment, rotor 18 includes a plurality of airfoil bodies 120 attached to hub 20 at an airfoil body root portion 122 and extending outward from hub 20. Alternatively, rotor 18 may include only one airfoil body 120. Airfoil bodies 120 include an airfoil body root portion 122. Generally, a wind turbine according to embodiments herein includes the same number of airfoil bodies as rotor blades. Typically, each airfoil body is associated to an adjacent rotor blade for increasing aerodynamic lift thereof. The exemplary wind turbine 10 includes three rotor blades 22 and three airfoil bodies 120. Alternatively, as shown in FIG. 12, it is contemplated a wind turbine 1200 including two blades 1222 and two airfoil bodies 1224.

Airfoil bodies 120 are mated to hub 20 by attaching a respective airfoil body root portion 122 to hub 20 at a plurality of airfoil load transfer regions 126. Airfoil load transfer regions 126 may include a hub load transfer region and an airfoil load transfer region (both not shown in FIG. 1). Loads induced to airfoil bodies 120 (e.g., static loads or dynamic loads) are typically transferred to hub 20 via airfoil load transfer regions 126. According to some embodiments, airfoil bodies 120 may be coupled to hub 20 by a coupling system 124 (see FIG. 4) configured for attaching airfoil body root portion 122 to hub 20 such that the relative position between airfoil bodies 120 and rotor blades 22 may be adjusted, as further discussed below.

According to embodiments herein, the aerodynamic profile of an airfoil body 120 is configured for increasing aerodynamic lift of an inner portion 166 (shown in FIG. 2) of at least one of the plurality of rotor blades 22. In particular, during operation of the wind turbine, the relative position between one of airfoil bodies 120 and an associated rotor blade 22 is fixed such that, upon rotation of rotor 18, this airfoil body modifies the flow of the wind in the surrounding of the associated rotor blade, so that aerodynamic lift of that rotor blade is increased relative to a configuration of wind turbine 10 without such airfoil bodies. The associated rotor blade is generally the rotor blade adjacent, in the counter-direction to rotation of rotor 18, to this airfoil body 120.

For configuration thereof, the aerodynamic profile may be predetermined by any suitable method that enables a design of an airfoil body according to embodiments herein. For example, the effect of an airfoil body on an associated rotor blade may be calculated using appropriate simulation methods or semi-empirical methods. For example, it may be assumed that the airfoil body and the associated rotor blade form a multi-element airfoil, in which the airfoil body constitutes a thin airfoil and the rotor blade constitute a thick airfoil. The effect of such a thin airfoil body on such a thick airfoil body may be studied by appropriately using, for example, the calculation methods described in the articles "Thick Airfoils & High Lift", Gaunaa et al. and "Prediction of Multi Element Airfoils With the EllipSys Code", Sørensen et al. (both articles published in "Research in Aeroelasticity EFP-2007-II", Risø-R-1698, June 2009, ISBN 978-87-550-3759-5, pp. 95-113). The content of these publications is incorporated herein by reference to the extent in which the application is not inconsistent therewith and in particular those parts thereof describing how to predict lift increase.

According to certain embodiments, herein, the increase of aerodynamic lift of an inner portion of a rotor blade due to the effect of an airfoil body according to embodiments herein may be of at least 200% or, more specifically, at least 250% or, even more specifically, at least 300%. Typically, the maximal lift coefficient ($L_{max, tot}/L_{max, single}$) acting on a rotor blade of a wind turbine according to embodiments herein is of at least 2.0 or, more specifically, of at least 2.25 or, even more specifically, of at least 2.5.

According to embodiments of the present disclosure, at least one airfoil body is provided as part of a wind turbine or, more particularly, as part of an aerodynamic assembly, the airfoil body including an aerodynamic profile. As shown in the figures, the aerodynamic profile of airfoil bodies 120 is typically configured for increasing aerodynamic lift of at least an inner portion of rotor blades 22. According to embodiments herein, the inner portion of rotor blades 22 refers to the portion thereof proximal to the blade root portion (i.e., proximal to hub 20). The aerodynamic profile of each of the airfoil bodies in the wind turbine is typically configured for increasing aerodynamic lift of at least an inner portion of a rotor blade associated thereto. According to embodiments herein, the increase in aerodynamic lift corresponds to a substantial increase thereof. For example, but not limited thereto, according to embodiments herein, the aerodynamic profile is configured for increasing the aerodynamic lift of an inner portion of an associated rotor blade in at least 50% or, more particularly, at least 100%, or even more particular, at least 150%, due to the associated airfoil body. Generally, the extent of the portion of the rotor blade on which lift is increased by an associated airfoil body may depend on the airfoil profile, the relative blade-airfoil position (in particular, the relative angle), yaw angle of the wind turbine and/or the particular wind conditions, such as wind speed.

Figure 2:
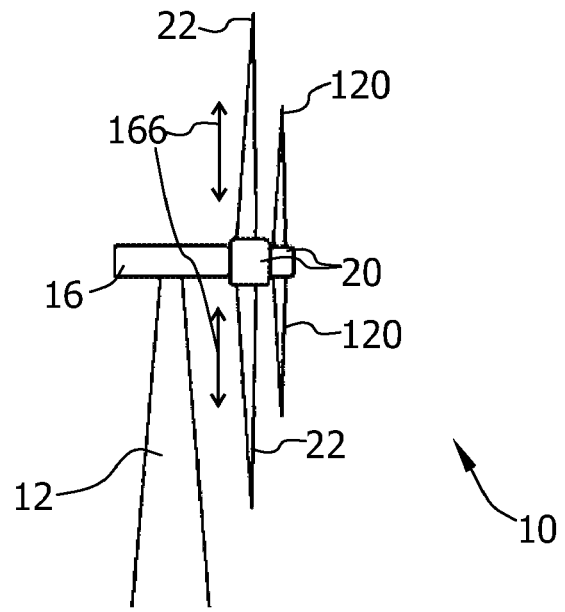
FIG. 2 is a schematic sectional view of the wind turbine shown in FIG. 1.

It should be noted that the inner portion of rotor blades 22 on which lift is increased by an associated airfoil body must not necessarily be a rotor blade end portion adjacent to hub 20. For example, the inner portion may extend within a middle portion of rotor blades 22. FIG. 2 illustrates an inner portion 166 of a rotor blade 22, on which a lift increase is effected by the proximity of an airfoil body 120. In the exemplary embodiment, airfoil bodies 120 are designed such that inner portion 166 does not extend to hub 20. Alternatively, inner portion 166 on which lift is increased may extend substantially onto hub 20. Airfoil bodies 120 form part of an aerodynamic assembly 118.

The inner portion of rotor blades 22 may include at least 25% of the total blade length or, more specifically, at least 33% thereof or, even more specifically, 50% thereof.

Generally, the longitudinal length of the airfoil bodies determines, among other factors, the extent of the inner portion of rotor blades on which aerodynamic lift is effected. According to typical embodiments, the longitudinal length of airfoil bodies 120 is equal to or less than the longitudinal length of rotor blades 22. For example, but not limited to, the longitudinal length of airfoil bodies 120 may be of less than approximately ⅓ of the longitudinal length of rotor blades 22 or, more specifically, of less than approximately ¼ thereof or, even more specifically, of less than approximately ⅕ thereof. The term "substantially" within the present disclosure is to be understood as indicating near, approaching, or exactly a certain state or value, including deviation such as a deviation of less than 20% or, more specifically, 10% or, even more specifically, 5%.

In the exemplary embodiment, airfoil bodies 120 are attached to hub 20 at a position upwind of the position at which rotor blades 22 are attached to hub 20. For example, but not limited to, airfoil bodies 120 may be attached to hub 20 at a position which is displaced along the horizontal direction at a suitable distance from the position at which rotor blades 22 are attached to hub 20. In particular, according to certain embodiments, airfoil bodies 120 are disposed at a plane parallel to and placed upwind of the vertical plane where rotor blades 22 are disposed Alternatively, the position at which airfoil bodies 120 are attached to hub 20 may be in the substantially same vertical plane where rotor blades 22 are disposed.

Airfoil bodies 120 are attached to hub 20 at any suitable position that facilitates airfoil bodies 120 to effect a lift increase on an associated rotor blade 22. For example, airfoil bodies 120 may be attached to hub 20 at respective positions displaced less than 90°, relative to axis of rotation 30 of hub 20, from the blade root portion 24 of their associated rotor blade or, more specifically, less than 60° thereof or, even more specifically, less than 30° thereof.

Airfoil bodies 120 include any suitable material that enables wind turbine 10 to function as described herein. In particular, the airfoil body material is chosen for providing the required strength to weight ratio, fatigue life and stiffness, as well as facilitating forming airfoil bodies 120 with the particular required shape. For example, but not limited to, airfoil bodies 120 may include glass- and/or carbon-fibre composites (such as, but not limited to, GFRP or CFRP) and/or wood composites. Airfoil bodies 120 may have the same material than rotor blades 22.

According to at least some embodiments herein, the relative position between airfoil bodies 120 and rotor blades 22 is fixed during operation of wind turbine 10. In these embodiments, it may be required to dismount the fixings for changing this relative position. Furthermore, this may imply a shutdown of wind turbine 10.

For example, airfoil bodies 120 may be attached to hub 20 at airfoil body root portion 122 by any suitable fixing means provided at airfoil load transfer regions 126, the fixings means enabling hub 20 to appropriately support airfoil bodies 120. In particular, such fixing means may include steel bolts (not shown), which can either be embedded in the airfoil body material in the axial direction or aligned radially to pass through an airfoil body perimeter.

For some particular applications, it is desirable that airfoil bodies 120 are attached to hub 20 in a manner such that the relative position between airfoil bodies 120 and rotor blades 22 may be adjusted without requiring a shutdown of the wind turbine 10. According to some embodiments, illustrated in, for example, FIGS. 3 to 5, wind turbine 10 further includes a coupling system 124 configured for attaching airfoil body root portion 122 to hub 20. Coupling system 124 is adapted for: a) fixing a relative Position between airfoil bodies 120 and rotor blades 22 during a rotation of rotor IS; and b) adjusting a relative position between airfoil bodies 120 and rotor blades 22. In particular, coupling system 124 may be adapted for adjusting this relative position during operation of wind turbine 10, even during a rotation of rotor IS. Thereby, no shutdown of wind turbine 10 is generally required for adjusting airfoil bodies 120. In this manner, embodiments herein facilitate responding to varying wind conditions by adjusting the position of airfoil bodies 120 for optimizing the effect of airfoil bodies 120 on rotor blades 22 without compromising power production by wind turbine 10.

Adjusting this relative position generally includes adjusting the angle formed between at least one of airfoil bodies 12 and the adjacent rotor blade, in the opposite direction to the rotor rotation, to the at least one airfoil body. That is, coupling system 124 may be adapted for varying the relative angle between an airfoil body 120 and an associated rotor blade during operation of wind turbine 10, even during a rotation of rotor 18. Varying this relative angle generally facilitates controlling the aerodynamic lift on the associated rotor blade.

Figure 4:
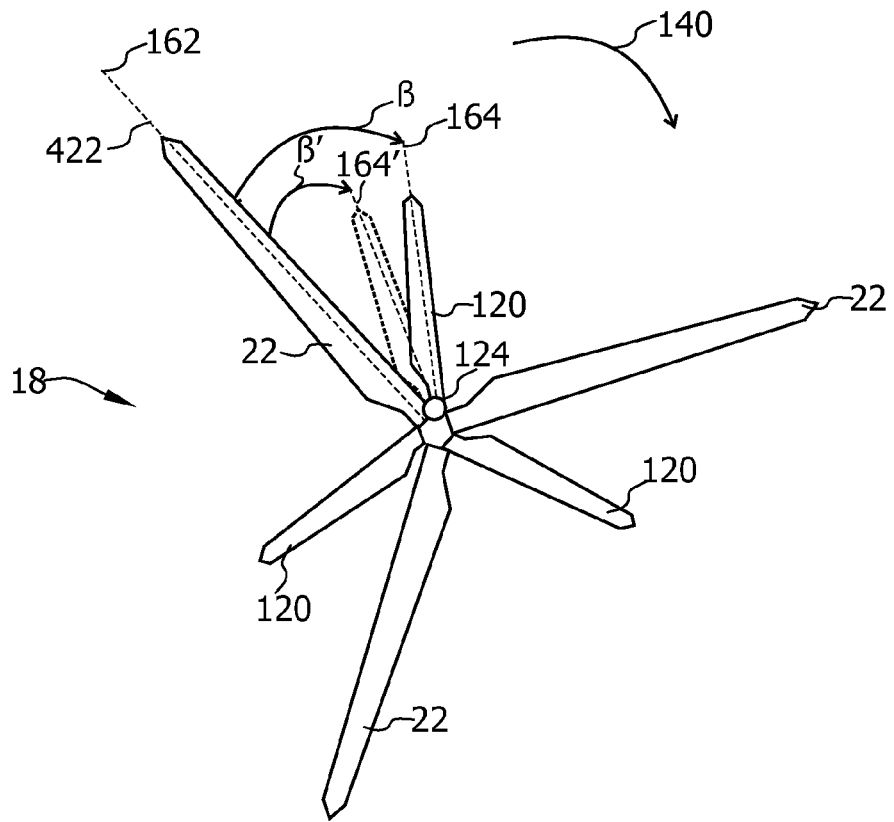
FIG. 4 is a schematic view of a portion of the wind turbine shown in FIG. 1.

As used herein, the angle formed between an airfoil body and a rotor blade is understood as the angle formed by the longitudinal axis of the airfoil body and the longitudinal axis of the rotor blade. According to typical embodiments, this angle is varied by rotating an airfoil body relative to and about the location at which the airfoil body is attached to hub 20. FIG. 4 is a schematic view of a portion of exemplary wind turbine 10, in particular of rotor 18 rotatable in a rotation direction 140. FIG. 4 illustrates the adjustment of an airfoil body 120 relative to an associated rotor blade 422 from an initial airfoil position to an adjusted airfoil position. At the initial position, airfoil body 120 forms an angle β with associated rotor blade 422. At the adjusted position, airfoil body 120 forms an angle β' with associated rotor blade 422. Thereby, the increase of lift effected by adjusted airfoil body 120 on associated rotor blade 422 is varied. It should be noted that, as set forth above, angles β and β' are considered to be the angles formed between longitudinal axes 164 and 164' of airfoil body 120 and longitudinal axis 162 of associated rotor blade 422.

Figure 3:
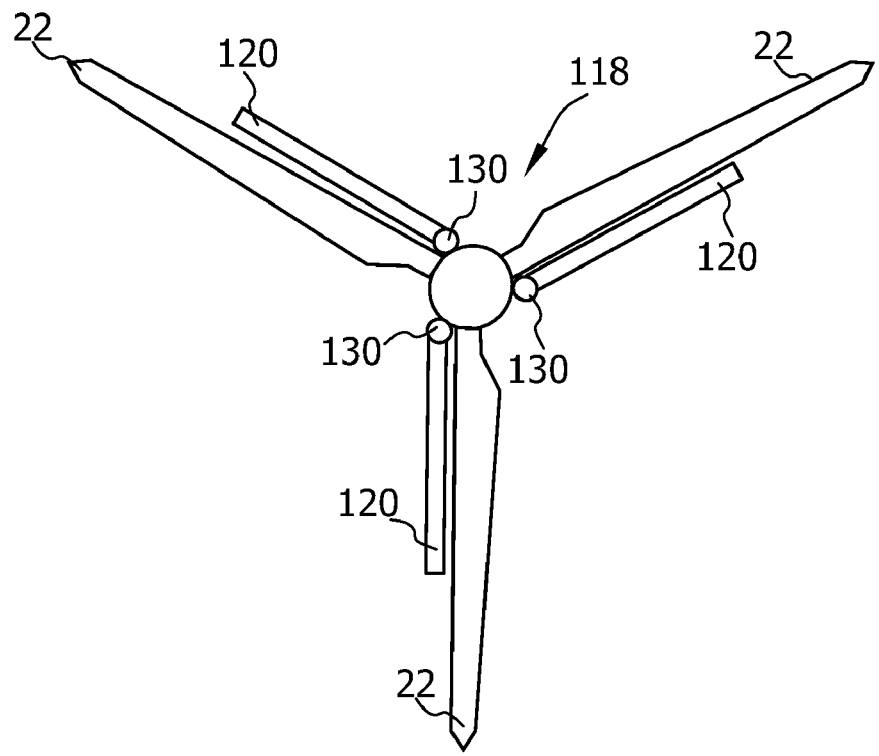
FIG. 3 is a schematic view of a portion of the wind turbine shown in FIG. 1.

FIG. 3 is a schematic view of a portion of another exemplary wind turbine illustrating a zero angle between airfoil bodies 120 and rotor blades 22. Generally, the lift effected by airfoil bodies 120 on rotor blades 22 decreases with increasing relative angles. A zero angle configuration, as illustrated in FIG. 3, generally corresponds to a configuration in which the lift increase effected by airfoil bodies is maximized. In addition thereto, there is a threshold angle from which airfoil bodies 120 effect no substantial lift increase on rotor blades 22. According to some embodiments, an airfoil body may be embedded on an associated rotor blade such that no substantial lift increase on the blade is effected by the airfoil body.

Figure 8:
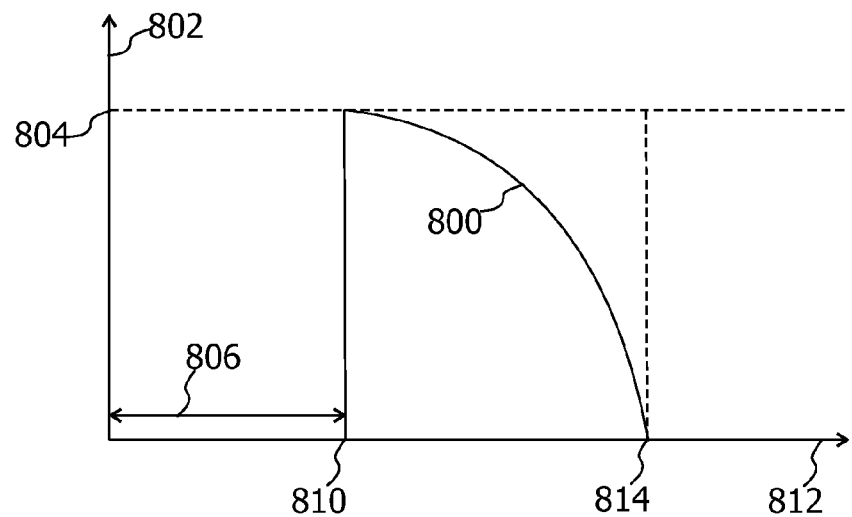
FIG. 8 is a schematic graphic illustrating variation of lift increase in the wind turbine shown in FIG. 1.

FIG. 8 shows a schematic graphic illustrating the variation 800 of lift increase 802 effected by an associated airfoil body 120 on a rotor blade 22 of exemplary wind turbine 10 depending on a position 812 of associated airfoil body 120. In the exemplary embodiment, airfoil body 120 effects no substantial lift increase (i.e., lift increase 802 is substantially zero) when positioned in a region 806, in which airfoil body 120 is embedded in rotor blade 22. Airfoil body 120 effects a maximal lift increase 804 when placed at an position 810 adjacent and parallel to rotor blade 22 (see FIG. 3,) forming an angle of zero degrees therewith. Lift increase 802 may decrease when this angle is increased (i.e., along a region between position 810 and a threshold angle position 814.) Typically, lift increase 802 is substantially zero when this angle is equal to or greater than a suitable threshold angle 814.

Generally, during operation of wind turbine 10, airfoil bodies 120 are adjusted to respond to varying wind conditions. For example, at relatively low wind speeds, it is generally advantageous to effect an increase of blade lift through an appropriate positioning of airfoil bodies. Thereby, power output of wind turbine 10 is generally increased in this wind regime. However, when wind speed is relatively high, wind turbine 10 reaches its nominal power output, which is generally maintained by appropriately pitching rotor blades 22. In this latter wind regime, an increase of blade lift is generally no longer required and airfoil bodies are positioned at a threshold angle or embedded in the respective rotor blade, so that no substantial lift increase is effected. Furthermore, as described below, embodiments herein may facilitate a decrease of the maximal thrust acting on rotor blades 22 as compared to other wind turbines.

Figure 6:
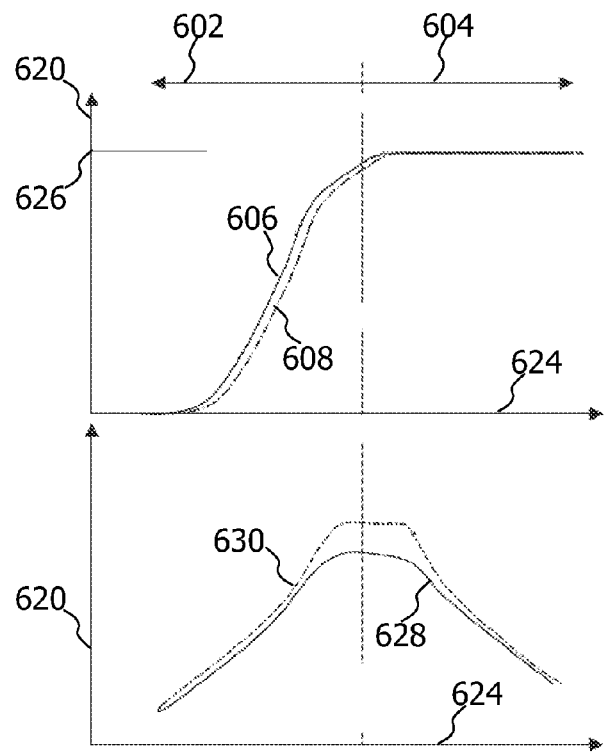
FIG. 6 is a schematic graphic illustrating different operational areas of the wind turbine shown in FIG. 1.

FIG. 6 is a graphic illustrating different operational areas of wind turbine 10. The graphic in FIG. 6 depicts power curves 606 and 608 corresponding to a variation of wind turbine generated power 620 with varying wind speed 624. Furthermore, the graphic in FIG. 6 depicts thrust curves 628, 630 corresponding to variation of thrust 620 with varying wind speed 624.

Power curve 606 corresponds to a power output of wind turbine 10. Power curve 608 corresponds to another wind turbine that does not implement airfoil bodies 120 according to embodiments herein. Wind turbine 10 may be operated in an operational area 602 in which airfoil bodies 120 effect an increase of lift on rotor blades 22 or, alternatively, in an operational area 604 in which airfoil bodies 120 effect no substantial lift increase on rotor blades 22. As illustrated in the graphic of FIG. 6, wind turbine 10 is operated at operational area 602 (i.e., with lift increase) when power 620 is below a rated power value 626 and at operational area 604 (i.e., with no lift increase) when power 620 is substantially at rated power value 626. Generally, at operational area 604, rotor blades are appropriately pitched for maintaining power output of wind turbine 10 at rated power value 626.

As illustrated by power curves 606 and 608, wind turbine 10 generates a higher power output due to lift increase in operational area 602, in comparison to a wind turbine, which does not implement airfoil bodies 120 according to embodiments herein. For example, for a configuration of wind turbine 10 with airfoil bodies 120 having ⅓ the length of rotor blades 22, an increase of 2.7% of the overall energy capture may be achieved.

Thrust curve 628 corresponds to a thrust acting on rotor blades 22 of wind turbine 10. Thrust curve 630 corresponds to a thrust in another wind turbine that does not implement airfoil bodies 120 according to embodiments herein. In view of the lift increase effected on rotor blades 22, airfoil bodies 120 may facilitate an operation of wind turbine 10 wherein capture of air flow by rotor 18 is more efficient. As illustrated by thrust curves 628 and 630, this higher efficiency is reflected on a decrease of thrust of wind turbine 10 as compared to the another wind turbine, which does not implements airfoil bodies 120 according to embodiments herein. In particular, the maximal thrust reached in the operation of wind turbine 10 may be significantly decreased by the implementation of airfoil bodies 120 as compared to the another wind turbine. It should be noted that such a thrust decrease may facilitate keeping lower the maximal loads acting on rotor 18. Thereby, operational lifetime of rotor 18, and in particular of rotor blades 22 may be increased. Furthermore, the loading requirements of the components of rotor 18 may be decreased. These potential advantages may translate in a significant cost reduction.

Figure 5:
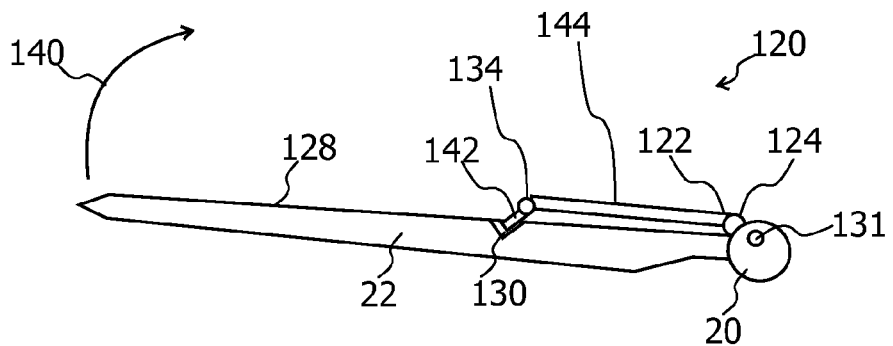
FIG. 5 is a schematic sectional view of a rotor portion of another wind turbine.

As illustrated in FIG. 5 and according to typical embodiments, coupling system 124 includes a drive system 131, adapted for adjusting the position of airfoil bodies 120. According to some embodiments, the position of airfoil bodies 120 is adjustable by drive system 131 to a position in which airfoil bodies 120 induce no substantial lift increase of aerodynamic lift on the associated rotor blades. As mentioned above, such a position may correspond to the threshold angle or to a position in which airfoil bodies 120 are embedded on respective rotor blades 22.

According to typical embodiments, and as depicted in FIGS. 3 to 5, coupling system 124 is a hinge adjacent to hub 20 and at which airfoil body root portion 122 is coupled to hub 20. The hinge is typically configured for enabling a rotation of airfoil body 120, or a portion thereof, in a plane parallel to the rotation plane of rotor 18 (i.e., a plane perpendicular to axis of rotation 30 in FIG. 1). According to alternative embodiments, coupling system 124 is a hinge placed at a middle position at one of airfoil bodies 120 for example, but not limited to, a position in the inner portion of the airfoil body extending ⅓ of the airfoil body length. Generally, drive system 131 is operatively coupled by a shaft system for effecting adjustment of the position of an airfoil body 120.

Control system 36 may be operatively associated to coupling system 124, and in particular to drive system 131, for adjusting the position of airfoil bodies 120 relative to rotor blades 22. According to some embodiments, each of airfoil bodies 120 is operatively coupled to a respective hinge, so that their position may be individually adjusted.

Alternatively, all airfoil bodies 120 may be connected to a common mechanism such as, but not limited to, a gear box (not shown), for simultaneously adjusting the position of airfoil bodies 120. For example, hub 20 may include a first hub portion (not shown) to which rotor blades 22 are attached and a second hub portion (not shown) to which airfoil bodies 120 are attached. During a normal operation of wind turbine 10, both hub portions may remain fixed relative to each other during rotation of hub 20 induced by wind impinging on rotor blades 22. For adjusting the relative blade-airfoil positions, the second hub portion may be rotated over the first hub portion by a driving mechanism. The second hub portion may be rotated over the first hub portion in the clockwise or counterclockwise directions for adjusting the relative blade-airfoil positions.

According to embodiments herein, wind turbine 10 includes three rotor blades, and the angle formed between an airfoil body 120 and its associated rotor blade is adjustable between approximately 0 and 60 degrees. Alternatively, wind turbine 10 may include two rotor blades, and the angle formed between an airfoil body 120 and its associated rotor blade may be adjustable between approximately 0 and 90 degrees.

According to certain embodiments, airfoil bodies 120 are rotatable about an airfoil body pitch axis, which axis is generally coincident with longitudinal axis 164 of airfoil bodies 120 (see FIGS. 3 and 4). In particular, a pitch angle of airfoil bodies 120, i.e., an angle that determines a perspective of airfoil bodies 120 with respect to direction 28 of the wind, may be, in addition to the blade pitch, changed by pitch adjustment system 32 to control the lift increase on an associated rotor blade by adjusting an angular position of at least one airfoil body 120 relative to wind vectors. Alternatively, the pitch angle of airfoil bodies 120 may be adjusted by a particularly dedicated adjustment system operating independently from pitch adjustment 32.

Depending on the particular configuration of wind turbine 10, moving airfoil bodies 120 towards a feathered position may strengthen or weaken the effect of an airfoil body on its associated rotor blade. Depending on the particular airfoil, a small pitching of airfoil bodies 120 in a particular direction may increase the total lift. Higher pitching thereof may result in a stall of airfoil bodies 120. In the exemplary embodiment, control system 36 individually controls airfoil body pitch of each of airfoil bodies 120. Alternatively, control system 36 may simultaneously control airfoil body pitch for all airfoil bodies 120.

Loading of airfoil bodies 120 by the impinging wind may be an issue in at least some applications, in particular in view of airfoil body free end 138. Moreover, impinging wind may effect a significant deflection of airfoil bodies 120 thereby undesirably decreasing the effect of an airfoil body on its associated rotor blade. Therefore, embodiments of the present disclosure include configuring airfoil bodies 120 in a manner such that the end portion of airfoil bodies 120 distal from hub 20 may be sustained by the associated rotor blade.

FIG. 5 illustrates such configuration of a rotor 18 of another exemplary wind turbine according to embodiments herein. In the exemplary embodiment, an airfoil body 120 is formed of two elongated members: an inner elongated member 144 proximal to hub 20 and attached thereto through coupling system 124; and an outer elongated member 142 movably coupled to inner elongated member 144 through a joint 134. In particular, joint 134 is for movably joining a free end 138 of airfoil body 120, which free end 138 is distal from airfoil body root portion 122, such that free end 138 can be coupled to associated rotor blade 22. Joint 134 may be coupled to or include a drive system 131 for adjusting the relative position between inner elongated member 144 and outer elongated member 142.

Airfoil body 120 in the exemplary embodiment is configured in a manner such that at least a portion of outer elongated member 142 can contact the side of rotor blade 22 on which wind impinges. Thereby, both ends of airfoil body 120 may be sustained by an associated rotor blade for facilitating mechanical stability of airfoil body 120. Typically, the main load of airfoil body 120 is transferred to hub 20 through coupling system 124.

The length of outer elongated member 142 may be chosen such that the position of both elongated members of airfoil body can be properly adjusted. For example, the length of outer elongated member 142 may be of at least 30% of the total airfoil body length or, more specifically, of at least 15% thereof or, even more specifically, of 5% thereof. Furthermore, outer elongated member 142 may consist of a telescopic element, so that its length may be adjusted. Typically, the aerodynamic profile configured for effecting lift increase on an associated rotor blade is included in inner elongated member 144. Alternatively, both inner elongated member 144 and outer elongated member 142 may include an aerodynamic profile configured for effecting increase of lift on the associated rotor blade.

In general, an airfoil body according to embodiments herein may include a plurality of elongated members, linked sequentially to each other by a plurality of joints. In particular, these elongated members may be configured such that the geometry of the airfoil body may be varied in order to vary the lift increase on an associated rotor blade. Alternatively or in addition thereto, these elongated members may be configured such that an end portion of the airfoil body may be coupled to the associated rotor blade as described above.

Figure 13:
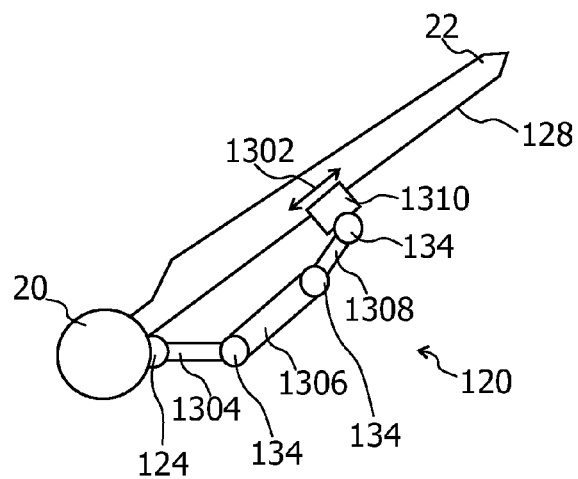
FIG. 13 is a schematic sectional view of a rotor portion of an exemplary wind turbine.

FIG. 13 shows another example of such embodiments. FIG. 13 schematically shows a portion of a wind turbine rotor. In the exemplary embodiment, an airfoil body 120 includes a plurality of elongated members, in particular, an inner elongated member 1304, a middle elongated member 1306, and an outer elongated member 1308. These members are movably linked to each other by joints 134 as described above. An aerodynamic profile configured for effecting lift increase on an associated rotor blade 22 may be provided in one or more of these members such as, but not limited to, middle elongated member 1306. In the exemplary embodiment, outer elongated member 1308 is linked to a clamping member 1310. Clamping member 1310 is formed complementary to leading edge 128 of an associated rotor blade 22. Clamping member 1310 may be adapted for sliding on leading edge 128 of rotor blade 22, i.e. along direction 1302. Thereby a highly stable and configurable airfoil body 120 may be achieved for facilitating control of lift increase on rotor blade 22.

As exemplarily shown in FIG. 5, rotor blade 22 includes a leading edge 128, which includes a docking element 130. Leading edge 120 is herein understood as the edge of rotor blade 22 going ahead during rotation of rotor 18. Docking element 130 is formed complementary to free end 138 of airfoil body 120. Free end 138 of airfoil body 120 is the end distal from airfoil body root portion 122 that is the end of the outer portion of airfoil body 120. Docking element 130 may be an indentation in rotor blade 22 formed complementary to free end 138 of airfoil body 120. The indentation may be formed having an aerodynamic profile, so that aerodynamic performance of rotor blade 22 is not compromised. Alternatively, docking element 130 may be a clamp element configured for fixing free end 138 of airfoil body 120 to the associated rotor blade.

Figure 9:
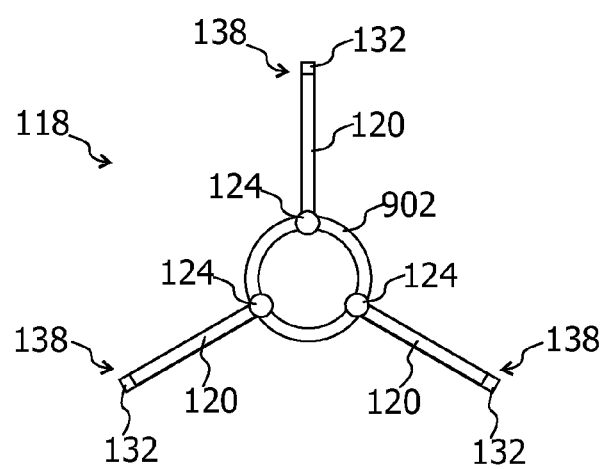
FIG. 9 schematically shows an aerodynamic assembly for use with the wind turbine in FIG. 1.

According to typical embodiments, airfoil bodies 120 may be implemented forming an aerodynamic assembly 118. The elements of aerodynamic assembly 118 may be assembled at the same time as the other elements of wind turbine 10 are assembled. Alternatively, aerodynamic assembly 118 may be designed and assembled for a previously built wind turbine. In particular, aerodynamic assembly 118 may be configured in a modular manner, so that it can be assembled in a previously built wind turbine. FIG. 9 illustrates an exemplary aerodynamic assembly 118 for use in, for example, wind turbine 10.

The exemplary aerodynamic assembly 118 includes airfoil bodies 120 including an airfoil body root portion and a coupling system 124 for attaching the airfoil body root portion to hub 20. Coupling system 124 is adapted for: a) fixing a relative position between airfoil bodies 120 and rotor blades 22 during a rotation of rotor 18; and b) adjusting the position of airfoil bodies 120 relative to rotor blades 22, such as described above. Typically, airfoil bodies 120 include an aerodynamic profile 156 configured for increasing aerodynamic lift of an inner portion 166 (see FIG. 2) of rotor blades 22. Aerodynamic assembly 118 may include a clamp for attachment thereof to wind turbine 10.

According to some embodiments, which may be combined with any of the embodiments described herein, airfoil bodies 120 include a wingtip device 132 for reducing aerodynamic drag of a free end 138 of airfoil body 120. Free end 138 is the end of airfoil body 120 distal from the airfoil body root portion. Typically, wingtip device 132 may be configured for reducing the effect of the free end of airfoil bodies 120 on rotor blades 22. This facilitates an aerodynamic assembly 118 which may be implemented without compromising aerodynamic performance of rotor blades 22 and/or power production of wind turbine 10.

Similarly, as illustrated in FIG. 5, airfoil bodies 120 of aerodynamic assembly 118 may include different portions movable relative to each other. The airfoil bodies 120 may include one or more joints 134 for movably joining the different airfoil body portions such that free end 138 of airfoil body 120 is movable relative to the airfoil body root portion. Thus, the form of airfoil body 120 may be adapted to specific conditions and/or to facilitate sustentation of free end 138 by an associated rotor blade when assembly 118 is mounted on a wind turbine, as described above.

Figure 10:
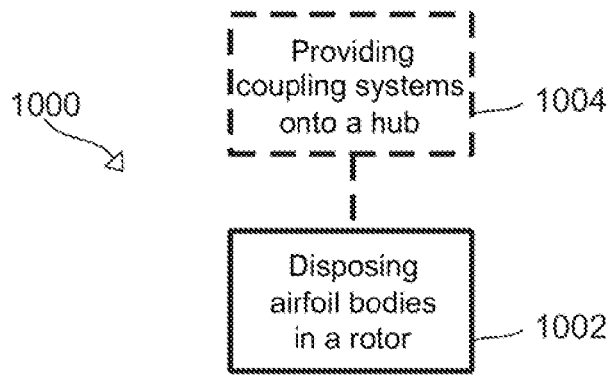
FIG. 10 shows a method of assembling the wind turbine in FIG. 1.

FIG. 10 schematically shows a method 1000 of assembling the wind turbine in FIG. 1. Method 1000 includes disposing 1002 airfoil bodies 120 in rotor 18, airfoil bodies 120 including an aerodynamic profile 156 and an airfoil body root portion 122. Airfoil bodies 120 are disposed in rotor 18 such that they are attached to hub 20 at airfoil body root portion 122. Typically, aerodynamic profile 156 is configured for increasing aerodynamic lift of at least an inner portion of an associated rotor blade, as described above.

Method 1000 may include a step 1004 of providing coupling systems 124 onto hub 20, coupling systems 124 being configured for attaching the airfoil body root portion 122 to hub 20. Thereafter, airfoil bodies 120 may be attached to hub 20 at airfoil body root portion 122 through coupling systems 124.

Figure 11:
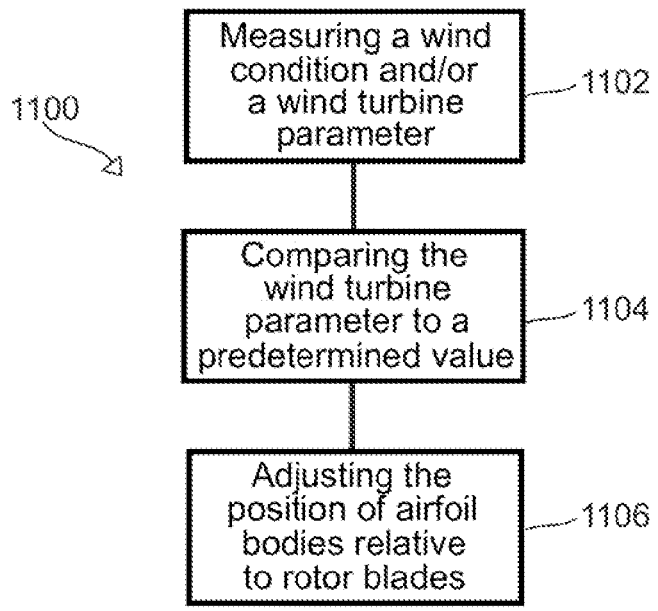
FIG. 11 shows a method of controlling the wind turbine in FIG. 1.

The present disclosure also contemplates a method of controlling a wind turbine. FIG. 11 shows a method 1100 of controlling exemplary wind turbine 10. Such a control method may include obtaining at least one operational parameter of the wind turbine (e.g., by measurement thereof). For example, method 1100 may include a step 1102 of measuring wind conditions in the proximity of wind turbine 10 and/or measuring a wind turbine parameter. Such a control method may further include evaluating said one operational parameter of the wind turbine. For example, method 1100 may further include a step 1104 of comparing the measured wind condition and/or the wind turbine parameter to a predetermined value. Alternatively or in addition thereto, step 1104 may include evaluating the measured wind conditions and/or the measured wind turbine parameter. For example, but not limited to, the power output of wind turbine 10 may be measured and evaluated for establishing whether wind turbine 10 produces power over a pre-determined value.

Such a control method may further include, adjusting at least one component of the wind turbine for regulating the increase of aerodynamic lift of at least an inner portion of a rotor blade effected by at least one of the airfoil bodies. For example, method 1100 may further include an additional step 1106 in which the position of airfoil bodies 120 relative to rotor blades 22 is adjusted in view of the result of the comparison/evaluation step 1104. For example, the angle formed between one of airfoil bodies and an associated rotor blade 120 may be adjusted for regulating lift increase. Furthermore, the position of airfoil bodies 120 may be adjusted to a position in which they effect no substantial lift increase on rotor blades 22, so that wind turbine 10 operates at operational area 604 as discussed above. Alternatively, or in addition thereto, method 1100 may further include an additional step, in which the shape of at least one of the airfoil bodies 120 is modified for regulating the increase of aerodynamic lift of at least an inner portion of one of rotor blades 120. For example, the shape of airfoil body 120 shown in FIG. 13 may be modified by changing the relative position of elongated members 1304, 1306 and/or 1308 to each other. In such control method, adjustment of the position of airfoil bodies may be effected by a drive system (e.g., drive system 130,) which is directly coupled to an airfoil body root portion. The shape of airfoil bodies 120 may be modified by a drive system associated to joints 134 of airfoil body 120 shown in FIG. 13.

Exemplary embodiments of systems and methods for a wind turbine are described above in detail. The systems and methods are not limited to the specific embodiments described herein, but rather, components of the systems and/or steps of the methods may be utilized independently and separately from other components and/or steps described herein.

As used herein, "a," "an," "at least one," and "one or more" are used interchangeably.

Although specific features of various embodiments of the invention may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine comprising:
 a rotor including a rotatable hub and a plurality of rotor blades, each of the plurality of rotor blades being attached to the hub; and
 at least one airfoil body including an aerodynamic profile and an airfoil body root portion;
 wherein said aerodynamic profile is configured for increasing aerodynamic lift of at least an inner portion of a rotor blade;
 wherein said at least one airfoil body is attached to said hub at said airfoil body root portion, and
 wherein said at least one airfoil body is attached to said hub in a manner such that a relative position between said at least one airfoil body and said plurality of rotor blades is fixable during a rotation of said rotor, and said relative position is adjustable for regulating the increase of aerodynamic lift of at least the inner portion of the rotor blade.

2. The wind turbine according to claim 1, wherein said relative position is adjustable by adjusting the angle formed between said at least one airfoil body and the rotor blade adjacent, in the counter-direction to rotor rotation, to said at least one airfoil body.

3. The wind turbine according to claim 1, further comprising a coupling system configured for attaching the airfoil body root portion to said hub, said coupling system including a drive system adapted for:
 fixing said relative position between said at least one airfoil body and said plurality of rotor blades during a rotation of said rotor; and
 adjusting the position of said at least one airfoil body relative to said plurality of rotor blades for regulating the increase of aerodynamic lift of at least the inner portion of the rotor blade.

4. The wind turbine according to claim 3, wherein the position of said at least one airfoil body is adjustable by said drive system to a position in which said at least one airfoil body induces no substantial lift increase of aerodynamic lift on the rotor blade adjacent, in the counter-direction to rotor rotation, to said airfoil body during a rotation of said rotor.

5. The wind turbine according to claim 1, wherein:
 said plurality of rotor blades consists of three rotor blades; and
 the angle formed between said at least one airfoil body and the rotor blade adjacent, in the counter-direction to rotor rotation, to said at least one airfoil body is adjustable between approximately 0 and 60 degrees.

6. The wind turbine according to claim 1, wherein:
 said plurality of rotor blades consists of two rotor blades; and
 the angle formed between said at least one airfoil body and the rotor blade adjacent, in the counter-direction to rotor rotation, to said at least one airfoil body is adjustable between approximately 0 and 90 degrees.

7. The wind turbine according to claim 1, wherein the at least one airfoil body is associated to one of the plurality of rotor blades for increasing aerodynamic lift of at least the inner portion of the associated rotor blade.

8. The wind turbine according to claim 1, wherein said aerodynamic profile is configured for increasing aerodynamic lift of an inner portion of the rotor blade adjacent, in the counter-direction to rotor rotation, to said at least one airfoil body during a rotation of said rotor.

9. The wind turbine according to claim 1, wherein the longitudinal length of the at least one airfoil body is smaller than the maximal longitudinal length of the plurality of rotor blades.

10. The wind turbine according to claim 1, wherein the longitudinal length of the at least one airfoil body is of less than approximately ⅓ of the maximal longitudinal length of the plurality of rotor blades.

11. The wind turbine according to claim 1, wherein a leading edge of at least one rotor blade of said plurality of rotor blades includes a docking element at the leading edge of the rotor blade, the docking element being formed complementary to a free end of said airfoil body, which free end is distal from the airfoil body root portion, for engagement of said free end to the rotor blade.

12. The wind turbine according to claim 1, wherein said at least one airfoil body is attached to the hub at a position upwind of, or in the same vertical plane than, the position at which said plurality of rotor blades is attached to the hub.

13. The wind turbine according to claim 1, wherein the at least one airfoil body includes a joint for movably joining a free end portion of said airfoil body, which free end portion is distal from the airfoil body root portion, such that said free end portion can be movable for coupling thereof with the rotor blade adjacent, in the counter-direction to rotor rotation, to said at least one airfoil body.

14. A method of assembling a wind turbine including a rotor, a rotatable hub, and a plurality of rotor blades, each of the plurality of rotor blades being attached to the hub, said method comprising:
 disposing at least one airfoil body in said rotor, said at least one airfoil body including an aerodynamic profile and an airfoil body root portion such that said at least one airfoil body is attached to said hub at said airfoil body root portion;
 wherein said aerodynamic profile is configured for increasing aerodynamic lift of at least an inner portion of a rotor blade, and
 wherein said at least one airfoil body is attached to said hub in a manner such that a relative position between said at least one airfoil body and said plurality of rotor blades is fixable during a rotation of said rotor, and said relative position is adjustable for regulating the increase of aerodynamic lift of at least the inner portion of the rotor blade.

15. An aerodynamic assembly for use with a wind turbine including a rotor comprising a rotatable hub and a plurality of rotor blades, each of the plurality of rotor blades being attached to the hub, the aerodynamic assembly comprising:
 at least one airfoil body including an airfoil body root portion; and
 a coupling system for attaching the airfoil body root portion to said hub, said coupling system including a drive system adapted for:
  fixing a relative position between said at least one airfoil body and said plurality of rotor blades during a rotation of said rotor; and
  adjusting the position of said at least one airfoil body relative to said plurality of rotor blades.

16. The aerodynamic assembly according to claim 15, wherein the at least one airfoil body includes an aerodynamic profile configured for increasing aerodynamic lift of an inner portion of at least one of said plurality of rotor blades.

17. The aerodynamic assembly according to claim 16, wherein the at least one airfoil body includes a wingtip device for reducing aerodynamic drag of a free end of said airfoil body, which free end is distal from the airfoil body root portion.

18. The aerodynamic assembly according to claim 16, wherein the at least one airfoil body includes a joint for movably joining different portions of the airfoil body such that a free end of said airfoil body, which free end is distal from the airfoil body root portion, is movable relative to said airfoil body root portion.

19. The aerodynamic assembly according to claim 15, wherein the at least one airfoil body is rotatable about an airfoil body pitch axis.

* * * * *